(12) United States Patent
Yao (10) Patent No.: US 11,138,597 B2
(45) Date of Patent: Oct. 5, 2021

(54) SYSTEM AND METHOD FOR IMPROVING SECURITY OF SMART CONTRACT ON BLOCKCHAIN

(71) Applicant: ADVANCED NEW TECHNOLOGIES CO., LTD., Grand Cayman (KY)

(72) Inventor: Zhongxiao Yao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 19 days.

(21) Appl. No.: 16/709,817

(22) Filed: Dec. 10, 2019

(65) Prior Publication Data

US 2020/0151718 A1  May 14, 2020

Related U.S. Application Data (63) Continuation of application No. 16/342,513, filed as application No. PCT/CN2018/117666 on Nov. 27, 2018.

(51) Int. Cl.
  G06Q 20/38 (2012.01)
  G06Q 20/40 (2012.01)
  (Continued)

(52) U.S. Cl.
  CPC ..... *G06Q 20/38215* (2013.01); *G06Q 20/401* (2013.01); *G06Q 20/405* (2013.01);
  (Continued)

(58) Field of Classification Search
  CPC combination set(s) only.
  See application file for complete search history.

(56) References Cited

U.S. PATENT DOCUMENTS

| 9,807,106 B2 | 10/2017 | Daniel et al. |
| 10,022,613 B2 | 7/2018 | Tran et al. |
| (Continued) | | |

FOREIGN PATENT DOCUMENTS

| CA | 3015569 A1 | 8/2017 |
| CN | 106874087 A | 6/2017 |
| (Continued) | | |

OTHER PUBLICATIONS

Ron White, How Computers Work, 2003, QUE, 7th (Year: 2003).*
(Continued)

*Primary Examiner* — Zeshan Qayyum
*Assistant Examiner* — Yingying Zhou (57) ABSTRACT

A computer-implemented method for improving security of smart contract comprises: obtaining a first and a second transactions both invoking a smart contract, wherein the first transaction is associated with a protection condition; executing the second transaction and updating a current state of the smart contract; determining whether the updated current state of the smart contract satisfies the protection condition; in response to determining that the updated current state satisfies the protection condition, executing the first transaction, and recording the second and the first transactions into a data block for adding to a blockchain; and in response to determining that the updated current state does not satisfy the protection condition, recording the second transaction into another data block for adding to the blockchain, without executing the first transaction.

15 Claims, 7 Drawing Sheets

(51) Int. Cl.
    *H04L 9/06*     (2006.01)
    *H04L 9/32*     (2006.01)

(52) U.S. Cl.
    CPC .......... *H04L 9/0637* (2013.01); *H04L 9/3263* (2013.01); *G06Q 2220/00* (2013.01); *H04L 2209/38* (2013.01); *H04L 2209/56* (2013.01)

(56) References Cited

U.S. PATENT DOCUMENTS

| | | |
|---|---|---|
| 10,114,969 B1 | 10/2018 | Chaney et al. |
| 2017/0011460 A1 | 1/2017 | Molinari et al. |
| 2017/0083860 A1 | 3/2017 | Sriram et al. |
| 2017/0149819 A1 | 5/2017 | Androulaki et al. |
| 2017/0287090 A1 | 10/2017 | Hunn et al. |
| 2017/0289111 A1 | 10/2017 | Voell et al. |
| 2017/0352027 A1 | 12/2017 | Zhang et al. |
| 2017/0353309 A1 | 12/2017 | Gray |
| 2018/0089758 A1* | 3/2018 | Stradling ............ G06F 12/1408 |
| 2018/0129953 A1 | 5/2018 | Saxena et al. |
| 2018/0129954 A1 | 5/2018 | Saxena et al. |
| 2018/0218176 A1 | 8/2018 | Voorhees et al. |
| 2018/0241546 A1 | 8/2018 | Leng et al. |
| 2018/0248880 A1 | 8/2018 | Sardesai et al. |
| 2018/0274943 A1 | 9/2018 | Stöcker et al. |
| 2018/0285810 A1 | 10/2018 | Ramachandran et al. |
| 2018/0285971 A1 | 10/2018 | Rosenoer |
| 2018/0309581 A1 | 10/2018 | Butler et al. |
| 2019/0057362 A1 | 2/2019 | Wright et al. |
| 2019/0130368 A1 | 5/2019 | Li et al. |
| 2019/0361731 A1 | 11/2019 | Qiu |

FOREIGN PATENT DOCUMENTS

| | | | | |
|---|---|---|---|---|
| CN | 107330701 A | * | 11/2017 | ........... G06Q 20/405 |
| CN | 107993069 A | | 5/2018 | |
| CN | 108109017 A | | 6/2018 | |
| CN | 108833398 A | | 11/2018 | |
| JP | 2018-36893 A | | 3/2018 | |
| JP | 2018-536938 A | | 12/2018 | |
| JP | 2019-3309 A | | 1/2019 | |
| JP | 2019-53729 A | | 4/2019 | |
| JP | 2019-83013 A | | 5/2019 | |
| KR | 10-2018-010458 A | | 9/2018 | |
| RU | 181439 U1 | | 7/2018 | |
| WO | 2017/090041 A1 | | 6/2017 | |
| WO | 2017/092788 A1 | | 6/2017 | |
| WO | 2018/111295 A1 | | 6/2018 | |
| WO | 2018/115567 A1 | | 6/2018 | |
| WO | 2018/140913 A1 | | 8/2018 | |
| WO | 2018/146373 A1 | | 8/2018 | |
| WO | 2018/157778 A1 | | 9/2018 | |
| WO | 2018/165104 A1 | | 9/2018 | |

OTHER PUBLICATIONS

Tsankov et al., Security: Practical Security Analysis of Smart Contracts, Aug. 24, 2018, https://arxiv.org/pdf/1806.01143.pdf (Year: 2018).*

Search Report for European Application No. 18865368.7 dated Jan. 15, 2020.

Examination Report for European Application No. 18865368.7 dated Jan. 27, 2020.

Office Action and Search Report for Russian Application No. 2019111962 dated Jan. 15, 2020.

Examination Report No. 1 for Australian Application No. 2018348324 dated Jan. 14, 2020.

Luu et al., "Making smart contracts smarter", In Proceedings of the 2016 ACM SIGSAC conference on computer and communications security, pp. 254-269, Oct. 2016.

Office Action for Canadian Application No. 3040783 dated Apr. 24, 2020.

Written Opinion for Singaporean Application No. 11201903439R dated Jun. 2, 2020.

Coverdale, "Solidity: Transaction-Ordering Attacks". Mar. 6, 2018, https://medium.com/coinmonks/solidity-transaction-ordering-attacks-1193a014884e.

Vasa, "HackPedia: 16 Solidity Hacks/Vulnerabilities, their Fixes and Real World Examples". Jul. 21, 2018, https://medium.com/hackernoon/hackpedia-16-solidity-hacks-vulnerabilities-their-fixes-and-real-world-examples-f3210eba5148.

Office Action for Korean Application No. 10-2019-7011448 dated Jun. 16, 2020.

"[Easy block chain of the liberal arts fondness] Easy understanding of Ethereum smart contracts"), Sep. 8, 2018.

Second Examination Report for Australian Application No. 2018348324 dated Jul. 8, 2020.

Office Action for Japanese Application No. 2019-520856 dated Jul. 28, 2020.

Office Action for Russian Application No. 2019111962 dated Sep. 10, 2020.

Office Action for Canadian Application No. 3040783 dated Feb. 18, 2021.

Notice of Allowance for Japanese Application No. 2019-520856 dated Mar. 2, 2021.

* cited by examiner

400 obtaining a first transaction and a second transaction both invoking a smart contract, wherein the first transaction is associated with a protection condition
402

↓ executing the second transaction and updating a current state of the smart contract
404

↓ determining whether the updated current state of the smart contract satisfies the protection condition
406

↙ ↘ in response to determining that the updated current state satisfies the protection condition, executing the first transaction, and recording the second and the first transactions into a new data block for adding to the blockchain
407 in response to determining that the updated current state does not satisfy the protection condition, recording the second transaction into another new data block for adding to the blockchain, without executing the first transaction
408

SYSTEM AND METHOD FOR IMPROVING SECURITY OF SMART CONTRACT ON BLOCKCHAIN

CROSS REFERENCE TO RELATED APPLICATION

This application is a continuation application of the U.S. patent application Ser. No. 16/342,513 filed on Apr. 16, 2019 and entitled "SYSTEM AND METHOD FOR IMPROVING SECURITY OF SMART CONTRACT ON BLOCKCHAIN", which is a national phase application of the International Application No. PCT/CN2018/117666, filed on Nov. 27, 2018. The contents of all of the above applications are incorporated by reference in the entirety.

TECHNICAL FIELD

This disclosure generally relates to computer technologies, and in particular, to systems and methods for improving security of smart contract on blockchain.

BACKGROUND

Blockchain technology promises data storage in a decentralized fashion. The data may be stored in a series of data blocks that have precedence relationship between each other, which forms a chain of blocks. The chain of blocks is maintained by a network of nodes, which are also responsible for validating the data before storing it into the blocks. With cryptography and consensus technologies employed by the nodes, the data stored in the blockchain is almost unchangeable. Thus, the network of nodes is also referred to as a blockchain consensus network. Recently, the blockchain technology has expanded to provide a framework for execution of smart contracts. A smart contract is a piece of code that can run in the blockchain consensus network to accomplish business logics made by users. Smart contracts may comprise a set of promises defined in the digital format and comprise agreements between parties that have relevant covenants spelled out in codes. Smart contracts may settle automatically depending on future signatures or trigger events. However, the blockchain smart contracts are susceptible to malicious attacks online, such as unauthorized asset transfers. It is thus imperative to improve the security of smart contracts to at least mitigate these risks.

SUMMARY

Various embodiments of the present disclosure can include systems, methods, and non-transitory computer readable media for improving security of smart contract on blockchain. According to one aspect, a system for improving security of smart contract comprises one or more processors and one or more non-transitory computer-readable memories coupled to the one or more processors and configured with instructions executable by the one or more processors to cause the system to perform operations comprising: obtaining a first transaction and a second transaction both invoking a smart contract, wherein the first transaction is associated with a protection condition; executing the second transaction and updating a current state of the smart contract; determining whether the updated current state of the smart contract satisfies the protection condition; in response to determining that the updated current state satisfies the protection condition, executing the first transaction, and recording the second and the first transactions into a new data block for adding to the blockchain; and in response to determining that the updated current state does not satisfy the protection condition, recording the second transaction into another new data block for adding to the blockchain, without executing the first transaction.

In some embodiments, the system is further caused to perform: in response to determining that the updated current state does not satisfy the protection condition, returning an execution exception to a computing device that submitted the first transaction.

In some embodiments, the current state comprises a current price of a transactional item of the smart contract; and the protection condition is associated with a price range, an amount range, or a time range of the transactional item.

In some embodiments, the first transaction is associated with a purchase order of the transactional item at the price range; and the second transaction is associated with a sales order of selling the transactional item.

In some embodiments, the protection condition is auto-generated based on the first transaction.

In some embodiments, the protection condition is submitted by a computing device that submitted the first transaction.

In some embodiments, obtaining the first transaction and the second transaction comprises obtaining the first transaction and the second transaction from a pool database.

In some embodiments, a plurality of nodes each comprise a memory for storing a copy of the blockchain as a ledger; and the nodes are configured to update the ledger when the new data block or the another new data block is added to the blockchain.

According to another aspect, a computer-implemented method for improving security of smart contract comprises: obtaining a first transaction and a second transaction both invoking a smart contract, wherein the first transaction is associated with a protection condition; executing the second transaction and updating a current state of the smart contract; determining whether the updated current state of the smart contract satisfies the protection condition; in response to determining that the updated current state satisfies the protection condition, executing the first transaction, and recording the second and the first transactions into a data block for adding to a blockchain; and in response to determining that the updated current state does not satisfy the protection condition, recording the second transaction into another data block for adding to the blockchain, without executing the first transaction.

According to another aspect, a non-transitory computer-readable storage medium is configured with instructions executable by one or more processors to cause the one or more processors to perform operations comprising: obtaining a first transaction and a second transaction both invoking a smart contract, wherein the first transaction is associated with a protection condition; executing the second transaction and updating a current state of the smart contract; determining whether the updated current state of the smart contract satisfies the protection condition; in response to determining that the updated current state satisfies the protection condition, executing the first transaction, and recording the second and the first transactions into a data block for adding to a blockchain; and in response to determining that the updated current state does not satisfy the protection condition, recording the second transaction into another data block for adding to the blockchain, without executing the first transaction.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Smart contracts may include agreements about a process or workflow and describe terms and obligations to be met by parties. In operation, an event-driven state machine may be used to examine terms of the smart contracts. Parties may record signatures and other non-revocable data on a shared ledger. Transactions may be used by users to call and execute smart contracts. A transaction refers to any communication between users or between a user and a financial entity. For example, a transaction may refer to a purchase or sale of good or services, an offer or a return of goods or services, a payment transaction, a credit transaction, or other like interactions. A transaction may also be referred to as a "transaction request," "trade," or "trading."

In some embodiments, a smart contract is a contract implemented, deployed, and executed within Ethereum environment. Smart contracts are digitization of the legal contracts. Smart contracts are deployed, stored, and executed within an Ethereum Virtual machine or various blockchain nodes. Smart contracts can store data. The data stored can be used to record information, fact, associations, balances, and any other information needed to implement logic for real world contracts. Smart contracts may be similar to Object oriented classes. A smart contract can call another smart contract like an Object-oriented object to create and use objects of another class.

Figure 1:
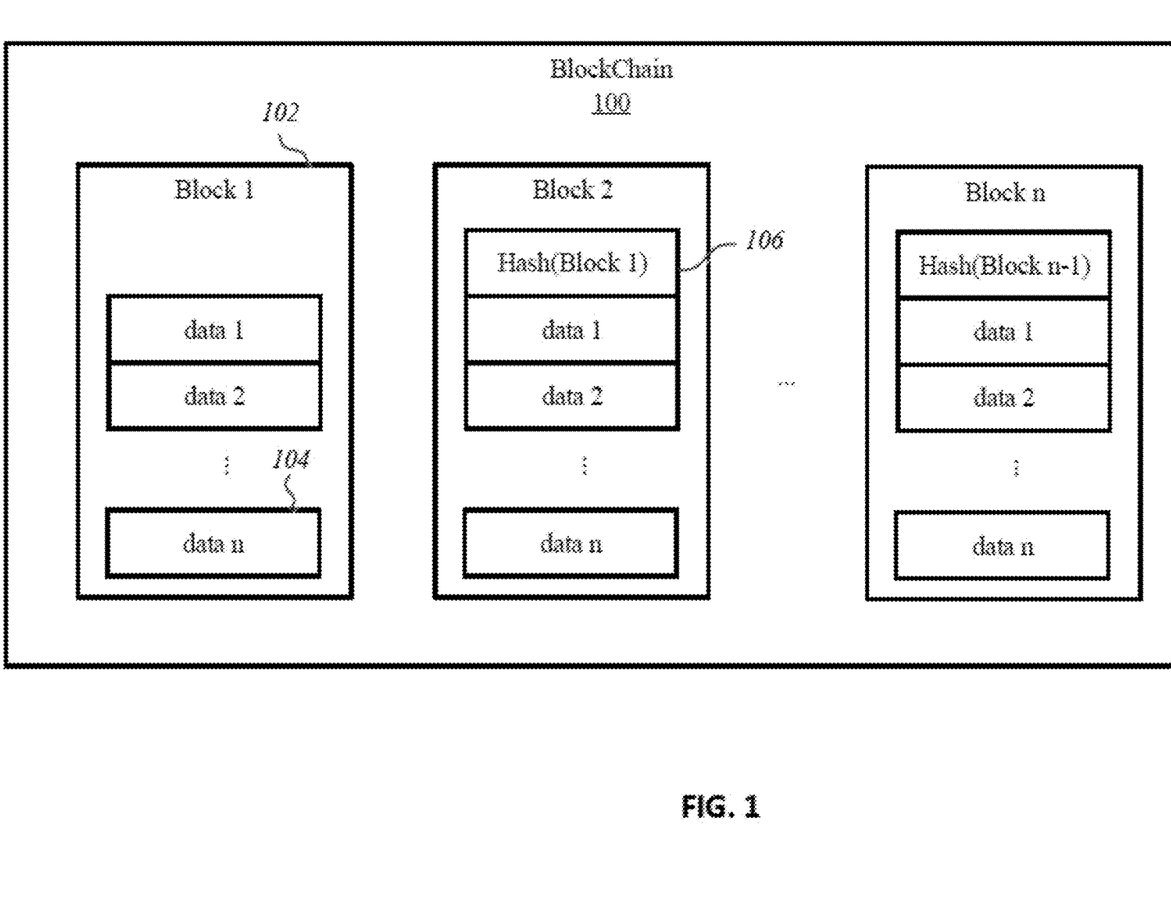
FIG. 1 illustrates an exemplary blockchain, in accordance with various embodiments.

The blockchain technology has been used to achieve optimization of a variety of services, such as transaction services in the smart contracts. FIG. 1 illustrates an exemplary blockchain, in accordance with various embodiments. As shown in FIG. 1, a blockchain 100 may include a plurality of data blocks 102. Each block may link to the previous block via a cryptographic hash. For example, block 2 is linked to block 1 via a hash 106 of block 1, block n is linked to block n-1 via another hash of block n-1. Each block 102 further includes a data structure. The data structure may include, for example, data 104 corresponding to the execution results of smart contracts, e.g., balance in account, payment receipts. As new data is submitted and validated, additional blocks including the new data may be generated and appended to the last block of the blockchain 100 by including the hash of the previous block.

In some embodiments, upon receiving a transaction request of an unconfirmed transaction, a blockchain node stores the transaction request in a memory pool (described in more details below with reference to FIG. 2B) temporarily before the blockchain network (e.g., one or more nodes) verify the unconfirmed transaction by consensus and pack the transaction to the blockchain. At certain point, the memory pool may store a number of unconfirmed transactions. The order to perform the unconfirmed transactions in the memory pool is not determined, before the blockchain consensus network pack the transactions into the blockchain. The ordering of the transactions affects the final outcome of executing the smart contract, which is referred to as Transaction-Ordering Dependence (TOD).

The TOD issue is further described in the context of the present disclosure. In some embodiments, data blocks in a blockchain may contain a set of transactions related to a smart contract. The state of the smart contract may be updated several times during each update of the blockchain. In one example, the blockchain is currently in a state σ, and a new data block to be added to the blockchain includes two transactions represented by $(T_i, T_j)$ which call the same smart contract respectively. Due to the undetermined order of execution of the two transactions, the exact state of the smart contract cannot be determined when each of the two transactions invokes the execution of the smart contract. For example, when the transaction $T_i$ calls the smart contract, it cannot determine whether the contract is in the state σ, or the contract has been executed based on a calling of the transaction $T_j$ and thus the state of the contract has been changed from $$\sigma \xrightarrow{T_j} \sigma'.$$

In other words, when the transaction $T_i$ calls the smart contract, the smart contract can be in the state σ, or in the state σ'. Similarly, when the transaction $T_j$ calls the same smart contract, the smart contract can be in a state σ, or the contract has been executed according to the calling of a transaction $T_i$ and has completed the state transition $$\sigma \xrightarrow{T_i} \sigma''.$$

Therefore, the states of the smart contract when called by the two transactions depend on the ordering of the execution of the transactions $T_i$ and $T_j$.

There may be a difference between the original state of the smart contract when the transaction intends to invoke the contract and the actual state of the smart contract when the corresponding execution occurs due to the call by the transaction. A blockchain node (e.g., a blockchain miner) may determine the order of execution of these transactions, and thus determine the order of the updates of the block. In other words, the final state of the smart contract may depend on the calling order by the blockchain node. This is referred to as TOD.

TOD may cause security risks for execution of smart contracts. First, if there are concurrent calls of a smart contract, even if the calls of the contract are non-malicious, the calls may interfere with each other and bring unexpected results to the users calling the contract through transactions. Second, a malicious user can take advantage of the TOD of smart contracts to gain inequitable benefits and even to steal other users' assets. For example, a seller may submit a sales transaction to hike up the price in the same time period when a buyer submits a purchase transaction with the expectation of purchasing at the original price before the hike. In this situation that the sales transaction and the purchase transaction are to be added to the same block of the blockchain, the buyer may end up paying for the hiked price if the sales transaction is executed before the purchase transaction.

In the context of Ethereum, some methods such as batch auction and pre-submission have been used to address the TOD problem. Although the batch auction solution may solve the TOD problem and prevent high-frequency trading, the execution efficiency of single transactions is sacrificed. Failure of one transaction will lead to failure of all submitted transactions. The pre-submission of transactions prior to the official execution of the transactions may avoid risks of the TOD. However, the pre-submission solution requires both parties to reach a consensus on the outcome before the execution, and thus decreases execution efficiency. Neither of the solutions fundamentally solves the TOD problem.

The present methods and systems provide technical solutions to at least mitigate the TOD problem. The disclosed types of operations represent a technology that is necessarily dependent on computer systems and which did not exist before the time of computers. The disclosed methods and systems also improve the functionality of computers by enhancing the security of performing blockchain smart contracts. Even when the transactions of a smart contract are implemented in an arbitrary order by the blockchain miners, the present systems and methods enable the transactions' calling of the smart contract to return an expected outcome or an execution exception. Unexpected outcomes can be prevented. For example, when a user (such as a buyer) submits a transaction requesting to purchase a product at a price, the outcome of the purchase transaction calling the smart contract may be accomplishing the purchase of the good at the requested price, or returning a failure if the price has been changed in the smart contract due to implementation of another transaction. Thus, the buyer's transaction may not be implemented at the changed price which is unexpected by the buyer. Accordingly, unauthorized transfers of assets realized by fraudulent transactions or transaction manipulation from the seller side can be avoided.

Figure 2A:
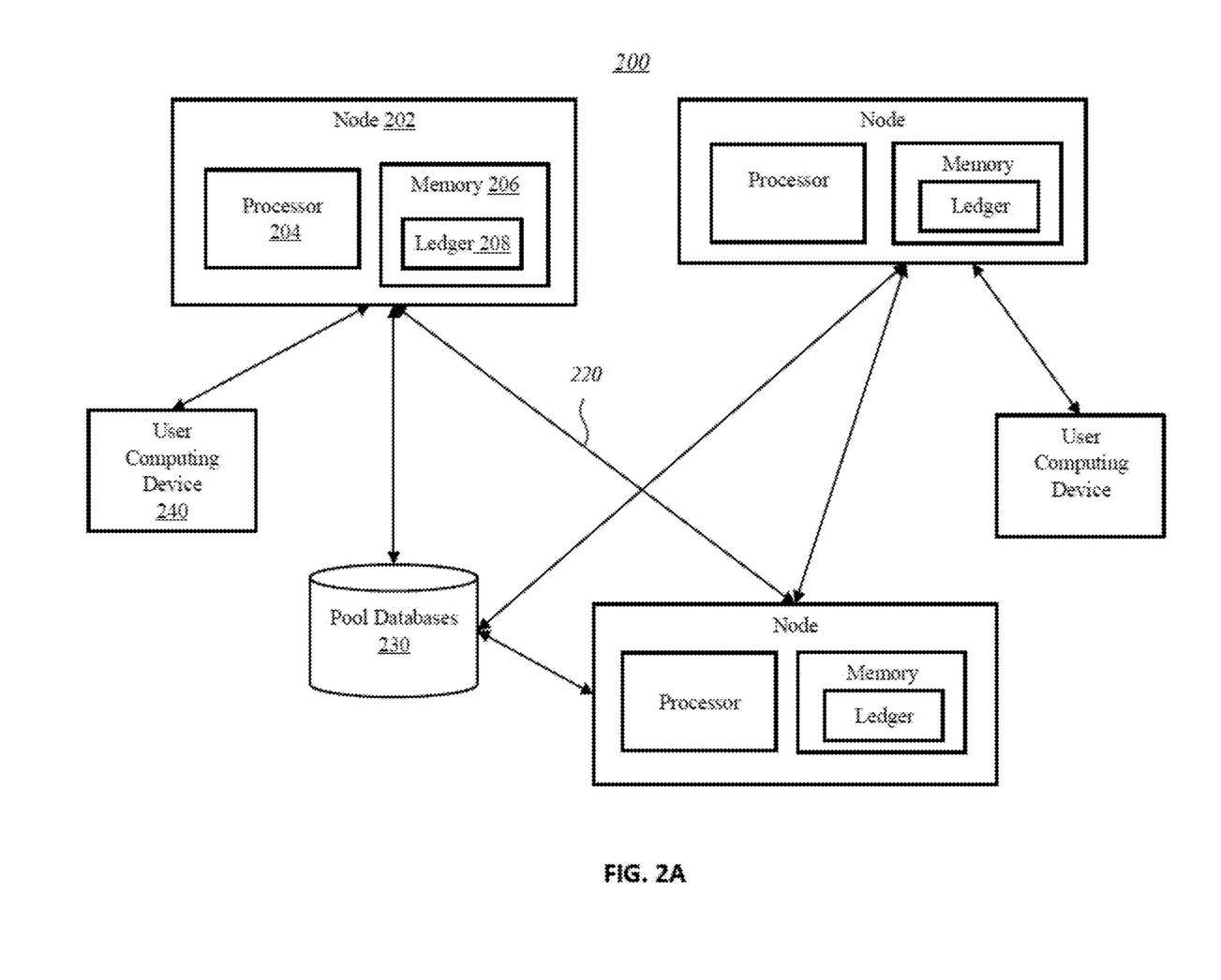
FIG. 2A illustrates an exemplary computing environment for improving security of smart contract, in accordance with various embodiments.

FIG. 2A illustrates an exemplary computing environment, e.g., a blockchain network 200 for performing smart contracts on blockchain, in accordance with various embodiments. As shown in FIG. 2A, the blockchain network 200 may include a plurality of nodes 202, pool database 230, and one or more user computing devices 240, which may be communicative between each other through one or more networks. An exemplary network 220 (e.g., wired or wireless connections, over the internet, etc.) may use one or more communication protocols, for example, cellular, WiFi, and other communication protocols. The network 220 may be based on a peer-to-peer and/or a client/server model. In some embodiments, the plurality of nodes 202 may comprise computing devices each including one or more processors 204 and one or more memories 206 (e.g., one or more non-transitory computer-readable storage media storing instructions) coupled to the one or more processors 204. The node 202 may be an exemplary system for improving security of smart contract. The one or more memories may be configured with instructions executable by the one or more processors to cause the system (e.g., the one or more processors) to perform operations described herein. In some embodiments, the processor 204 may be implemented partially or entirely as one or more logic circuits. In some embodiments, the nodes 202 and the user computing devices 240 may include other computing resources and/or have access (e.g., via one or more connections/networks) to other computing resources.

In some embodiments, the node 202 may include a smart contract execution engine (e.g., Ethereum Virtual machine). The smart contract execution engine can include instructions or program code stored on the memory 206 and executable by the processor 204. When the smart contract execution engine is executed by the processor 204, the smart contract execution engine applies parameters of the smart contract to execute the smart contract. In some embodiments, the user computing device 240 may store instructions or program code, which when executed by a processor on the user computing device 240, cause the user computing device 240 to render a calling interface on the user computing device 240. The call interface is configured to enable a user to call the smart contract to implement a transaction request. The calling interface may be configured to allow a user to input a protection condition (e.g., a price condition of goods) along with a transaction submitted by a user. The smart contract execution engine may be configured to determine if the state of the smart contract satisfies the protection condition submitted along with the transaction by the user input.

Figure 2B:
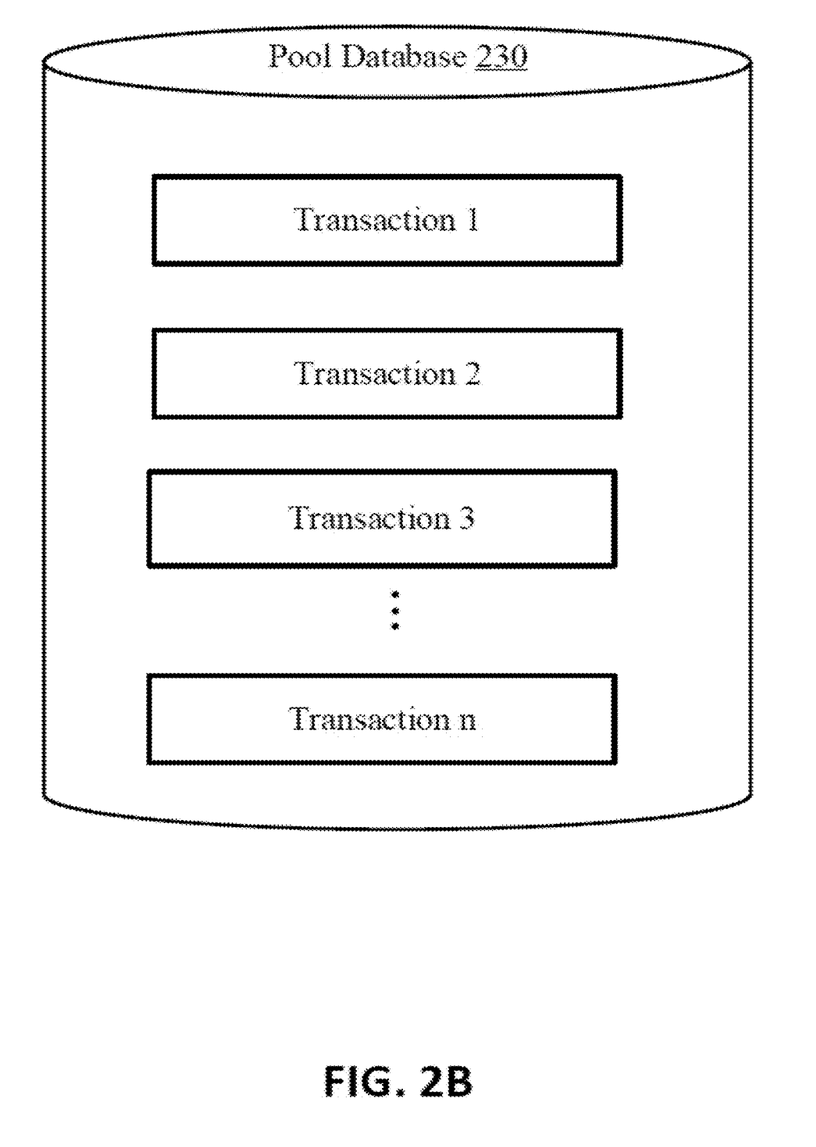
FIG. 2B illustrates an exemplary pool database, in accordance with various embodiments.

In some embodiments, the pool database 230 may be accessible to the plurality of nodes 202 in a distributed manner. For example, the pool database 230 may be respectively stored in the memories 206 of the plurality of nodes 202. Referring to FIG. 2B, an exemplary pool database 230 is illustrated, in accordance with various embodiments. The pool databases 230 may store a plurality of transactions submitted by the one or more user computing devices 240 operated by users.

Referring back to FIG. 2A, in some embodiments, the blockchain 100 is stored in a decentralized manner on the plurality of nodes 202. In some embodiments, some of the nodes 202 may validate transactions which they have received through consensus and propagate the validated transactions to the other nodes 202. Accordingly, the nodes 202 may update ledger 208 according to the validated transactions. The nodes 202 may communicate with one another via the network 220 to transmit and receive data related to the ledger 208. The ledger 208 includes the data blocks 102 that have been validated and added to the blockchain 100. As new data blocks are added to the ledger 208, the nodes 202 may communicate or share the new data blocks via the network 220. The memory 206 of the nodes 202 may store at least a portion of the ledger 208 of blockchain 100.

In some embodiments, some of the nodes 202 may be consensus nodes (e.g., blockchain miners) that choose which transactions to include in a data block 102, and in doing so the nodes 202 set the order of the transactions, e.g., which transactions are to be executed earlier and which transactions are to be implemented later. For example, when the user computing device 240 operated by a user submits a transaction request, the transaction may be temporarily stored in the pool database 230. A node 202 (e.g., a miner node) may choose a time to execute the transaction. The outcome of the transaction may depend on the relative order or timing that the node 202 determines to execute. For simplicity and conciseness, the present disclosure uses the singular form of the node 202. A person having ordinary skill in the art should appreciate that the blockchain may have multiple nodes 202 and one or more nodes 202 may be involved in processing one transaction. The singular form of node 202 may represent one or more nodes.

Alternative to the node 202, a dedicated Ethereum Virtual machine (e.g., installed in one or more computers or servers) can perform the various steps described herein. The Ethereum Virtual machine may comprise one or more processors and one or more non-transitory computer-readable memories coupled to the one or more processors and configured with instructions executable by the one or more processors to cause the Ethereum Virtual machine to perform operations described herein. Alternatively, other types of Virtual machines or software may be used in place of the Ethereum Virtual machine.

In some embodiments, the node 202 may receive a transaction from a user through the user computing device 240. The node 202 may also receive a protection condition along with the transaction from the user. In some embodiments, a calling interface of the user computing device 240 may instruct the user to add a protection condition to the user's transaction. Alternatively, the node 202 may generate the protection condition based on the content of the transaction submitted by the user. The protection condition may be a price of goods or a service, an amount of goods or a service, a time of shipping of goods or delivery of a service, etc. In some embodiments, the submitted transactions are stored in the pool database 230 for execution in a group. The transaction associated with the protection condition may involve calling a smart contract. For example, the user is a buyer who submitted a transaction that calls a smart contract, the smart contract requesting to buy 10 units of goods at a price of one dollar. The protection condition associated with the transaction may be that the price of the goods is one dollar (or a range such as less than one dollar), and the transaction cannot be implemented when the protection condition is not met.

The protection condition may be added to the transaction to avoid unexpected outcome due to the TOD. The protection condition may also be referred to as an execution condition, an execution protection condition, or a condition. In some embodiments, by checking a state of a smart contract against the protection condition, the node 202 may implement the transaction that calls the smart contract to return an expected outcome or return a failure, avoiding unexpected outcomes, e.g., purchasing goods or a service at an unexpected price. In other words, a protection condition may be defined to protect a user from entering into an unexpected transaction, e.g., a price-hiked transaction.

In some embodiments, the node 202 may determine a current state of the smart contract. For example, a state of the smart contract may be also called a world state of the blockchain. A world state of the blockchain may reflect the most updated state with respect to all transactions executed on the blockchain. For example, every time when a set of transactions has been implemented, the world state of the blockchain may be updated to reflect the implementation. The node 202 may implement the transaction based on the protection condition and the current state of the smart contract. Based on result of the implementation of the transaction, the node 202 may update the current state of the smart contract to another state (which may be the same as or different from the current state). The implementation of the transaction based on the protection condition and the current state of the smart contract may include a number of following scenarios.

In some embodiments, the node 202 may determine whether under the current state a of the smart contract, the transaction protection condition c (e.g., price is one dollar) is met before executing the transaction T. In the current state σ of the smart contract, if the protection condition c is not met (σ $\notin$ c), the transaction T may be y discarded, as indicated in the following equation (1). In the above example, under the current state σ of the smart contract, if the price of the goods is not one dollar (e.g., the price has been hiked to two dollars due to the execution of a prior transaction), the condition c is not met and this transaction may be discarded. The equation (1) may also be referred to as a rule $TX_{-STALE}$ $$TX_{-STALE} \frac{T \equiv \langle c, *, *, \ldots \rangle \ \sigma \notin c}{\sigma \xrightarrow{T} \sigma}, \tag{1}$$

where, TX and T represent a submitted transaction; c represents a protection condition of the transaction TX or T; σ represents a world state of the blockchain;

$$\xrightarrow{T}$$

indicates transformation. In some embodiments, if there is no protection condition specified in a transaction, it may be deemed that no protection conditions are needed for the transaction.

In some embodiments, under the current state σ of the smart contract to be called by the transaction, if the protection condition c of the transaction is met (σ $\in$ c), the node 202 may update a balance of the smart contract by a value v. For example, the node 202 may add or subtract the value v to or from the balance. The value v may be of a value determined based on the content of the transaction. In some embodiments, the smart contract may be associated with an inventory stored in the blockchain network 200, for example, the pool databases 230, or one or more of the nodes 202. The inventory may store the numbers of the items of the transactions, their prices, and other related information of the items. A balance of the smart contract may refer to the number of one of the items. Thus, when the current state of the smart contract meets the condition of the transaction, the node 202 may update the balance of the smart contract (e.g., the number of item inventoried) to temporarily reserve a number of the item to be purchased or sold by the transaction. In the above example, in the current state σ of the smart contract, if the price of the goods is one dollar, the protection condition c of the transaction is met and the node 202 may update the balance of the smart contract by subtracting 10 units of the goods to be purchased from the balance.

In another example, if a seller submits a transaction to sell goods (e.g., 15 unites of goods) under the smart contract, and if the current state of the smart contract meets the protection condition associated with the transaction of the seller (e.g., the contract price matches the selling price of the transaction), the node 202 may update the smart contract's balance based on the number of goods to be sold by adding 15 units of goods to the balance of the smart contract. In some embodiments, the node 202 may also update a balance of the seller or buyer. For example, the node 202 may add the number of goods to be purchased into the balance of the buyer and reduce the number of goods to be sold from the balance of the seller.

In some embodiments, if the update of the balance of the smart contract succeeds, the node 202 may change the current state σ of the smart contract to a transitional state σ'. For example, the world state of the blockchain may be changed from the state σ to a transitional state σ'. If the update of the balance of the smart contract fails (e.g., there is no sufficient inventory of the smart contract to provide the number of goods to be purchased), the transaction cannot proceed and the node 202 may discard the transaction. The state of the smart contract may be kept at the state σ.

In some embodiments, when the update of the smart contract balance succeeds, the node 202 may execute the transaction by calling or invoking corresponding code of the smart contract. For example, the node 202 may execute a set of transactions which are temporarily stored in the pool database 230, where the set of transactions include the transaction having the protection condition that has been checked against the state of the smart contract. In some embodiments, the transactions to be executed in the group may each have a protection condition. In some embodiments, some transactions in the group may not have a protection condition and the node 202 assumes that these transactions have passed the condition check as described above. In this way, the blockchain network 200 or the nodes 202 can execute existing smart contracts, which may not have protection conditions.

In some embodiments, when executing the smart contract, parameters l associated with the transaction may be passed into one or more processes or functions of the smart contract, and the one or more processes or functions of the smart contract may be executed. If the execution of the smart contract can be completed, the node 202 may change the state of the smart contract from the transit state σ' to an end state σ". Thus, the implementation of the transaction has been completed. Such a process may be represented by the following equation (2).

$$TX_{\text{-}SUCCESS} \frac{T \equiv \langle c, id, v, l\rangle \quad M \leftarrow \sigma[id]}{\sigma \in c \quad \sigma' \leftarrow \sigma[id][bal \mapsto \sigma[id][bal] + v]} \frac{\langle\langle M, l\rangle \cdot \varepsilon, \sigma'\rangle \to \langle \varepsilon, \sigma''\rangle}{\sigma \xrightarrow{T} \sigma''} \quad (2)$$

where, TX and T represent a submitted transaction; c represents a protection condition of the transaction TX or T; id represents an address of a smart contract in the blockchain; M represents smart contract execution code or a portion of the smart contract execution code; l represents smart contract invocation parameters; bal represents an account balance of the smart contract; σ[id] represents, in the state σ, the corresponding smart contract code at address id; σ[id][bal] represents the account balance of the smart contract at the address id in the state σ; σ, σ', and σ" represent three world states of the blockchain; ← indicates assigning value; → and $$\xrightarrow{T}$$

indicate transformation; ε represents a call stack for execution of the smart contract execution code M.

In some embodiments, under the transitional state σ' of the smart contract, if the execution of the smart contract cannot complete, and an execution exception occurs, the node 202 may revert the transitional state σ' of the smart contract to the state σ. For example, the world state of the blockchain may be reverted from the transitional state σ' to the original state σ. An execution exception may occur when there is an error in the execution process, or a present condition is met. For example, the execution has run for more than a predetermined time and is still running (also referred to execution timeout), or the number of goods to be purchased is more than the inventory of the smart contract, etc. In some embodiments, the node 202 may return an execution exception $\langle e \rangle_{exc}$ indicating that execution of the transaction has failed. This situation may be described in the following equation (3).

$$TX_{\text{-}EXCEPTION} \frac{T \equiv \langle c, id, v, l\rangle \quad M \leftarrow \sigma[id]}{\sigma \in c \quad \sigma' \leftarrow \sigma[id][bal \mapsto \sigma[id][bal] + v]} \frac{\langle\langle M, l\rangle \cdot \varepsilon, \sigma'\rangle \to \langle\langle e \rangle_{exc}, \bullet\rangle}{\sigma \xrightarrow{T} \sigma} \quad (3)$$

where, TX and T represent a submitted transaction; c represents a protection condition of the transaction TX or T; id represents an address of a smart contract in the blockchain; M is machine code and represents smart contract execution code; l represents smart contract invocation parameters; bal represents an account balance of the smart contract; σ[id] represents, in the state σ, the corresponding smart contract code at address id; σ[id][bal] represents the account balance of the smart contract at the address id in the state σ; σ, σ', and σ" represent three world states of the blockchain; ← indicates assigning value; → and $$\xrightarrow{T}$$

indicates transformation; ε represents a call stack for execution of the smart contract execution code M; $\langle e \rangle_{exc}$ represents an execution exception of the transaction.

The exemplary scheme described in the equations (1)-(3) ensures that the parties submitting the transactions either get an expected output or a failure of the transactions. Buyers can be assured of not paying more than the price they agree to when they issued the purchase orders. In addition, the scheme can be backward-compatible. In existing smart contracts, protection conditions can be set to be "true" as default, and thus there is no need to change the existing smart contract code to apply the scheme described in equations (1)-(3).

Figure 3:
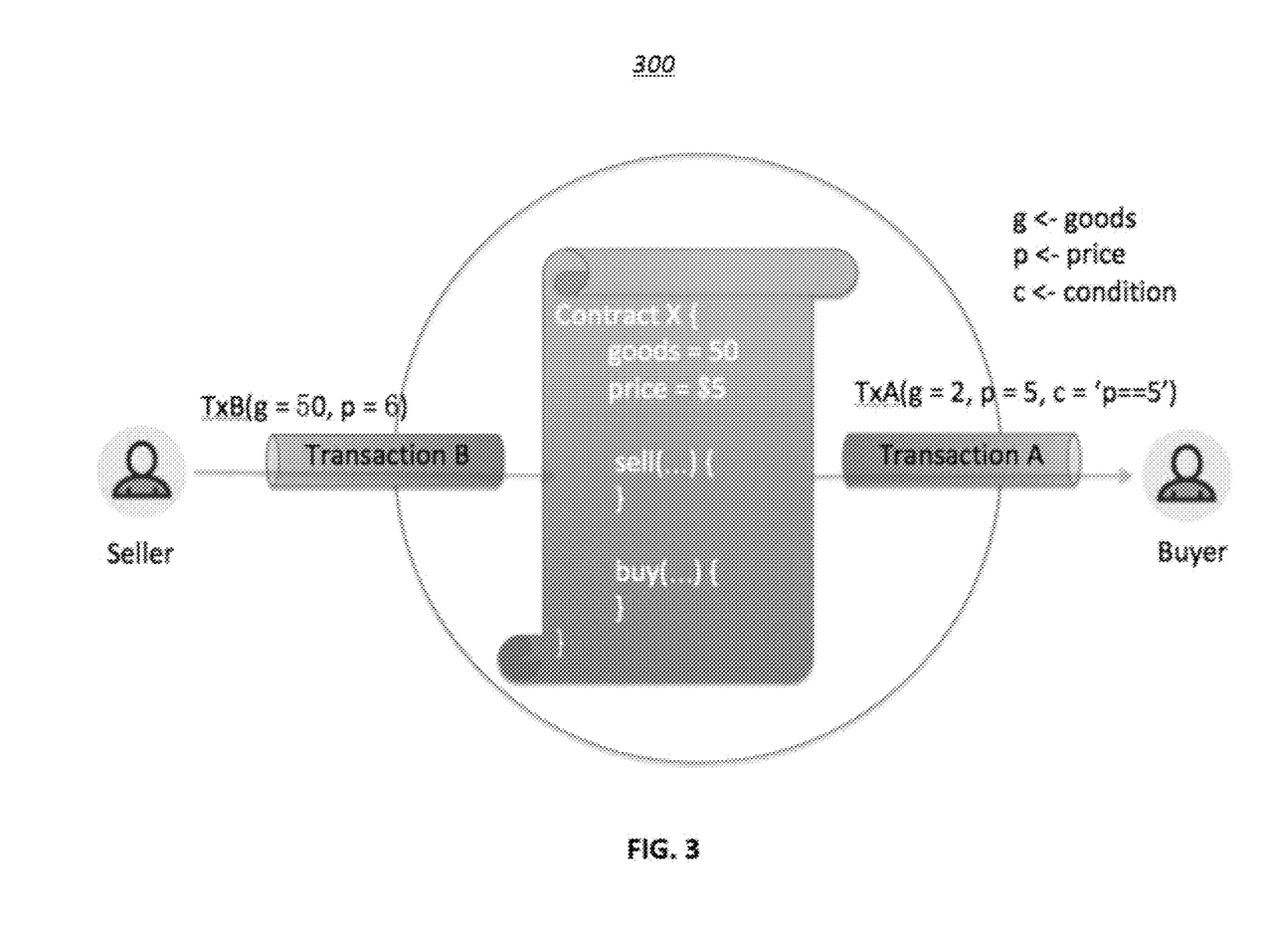
FIG. 3 illustrates an exemplary smart contract execution model, in accordance with various embodiments.

Referring to FIG. 3, an exemplary smart contract execution model 300 is illustrated, in accordance with various embodiments. The exemplary smart contract execution model 300 may be an application of the scheme described above with reference to FIGS. 2A-2B and may be implemented by the one or more entities in the blockchain network 200, e.g., the node 202, the user computing device 240, and the pool database 230. As shown in FIG. 3, a seller has submitted a transaction "TxB," and a buyer has submitted a transaction "TxA" substantially within the same time period. The time period may be one during which the blockchain accepts submissions of transactions for validation. In some embodiments, the two transactions have been stored in the pool database 230 temporarily. The transaction "TxA" is to call a "buy" process of a smart contract "X" to buy two units of goods (represented by "g=2" in the transaction "TxA") at a price of $5 ("p=5") under a protection condition that the price of the goods is fixed at $5 ("c='p==5'"). On the other hand, the transaction "TxB" submitted by the seller is to execute a "sell" process of smart contract "X" to sell all units of the goods (e.g., 50 units, and represented by "g=50") at a price of $6 ("p=6").

Without knowing the existence of the seller's transaction "TxB," the buyer has learned that the current contract price is $5 and therefore expected to complete the transaction "TxA" at the price of $5. If the buyer's transaction "TxA" is executed first, the protection condition for the transaction "TxA" is satisfied, and the transaction "TxA" may be implemented normally. However, if the seller's transaction "TxB" is executed first, the price of all units of the goods in the smart contract "X" increases to $6, and the state of the smart contract "X" is converted to a new state. Therefore, if subsequently executing the buyer's transaction "TxA," under the new state of the smart contract "X," the protection condition "c='p==5'" of the buyer's transaction "TxA" is not met, and thus the buyer's transaction "TxA" is terminated because the buyer and the seller have not been reached an agreement of the price.

Compared with the methods of batch auction and pre-submission in Ethereum, the present conditional protection-based transaction execution mechanism avoids the ordering dependence among transactions by setting an execution condition for each transaction, and thus does not affect the execution efficiency of an individual transaction. Further, the disclosed systems and methods prevent extra cost due to multiple execution stages brought by the pre-submission method.

Figure 4:
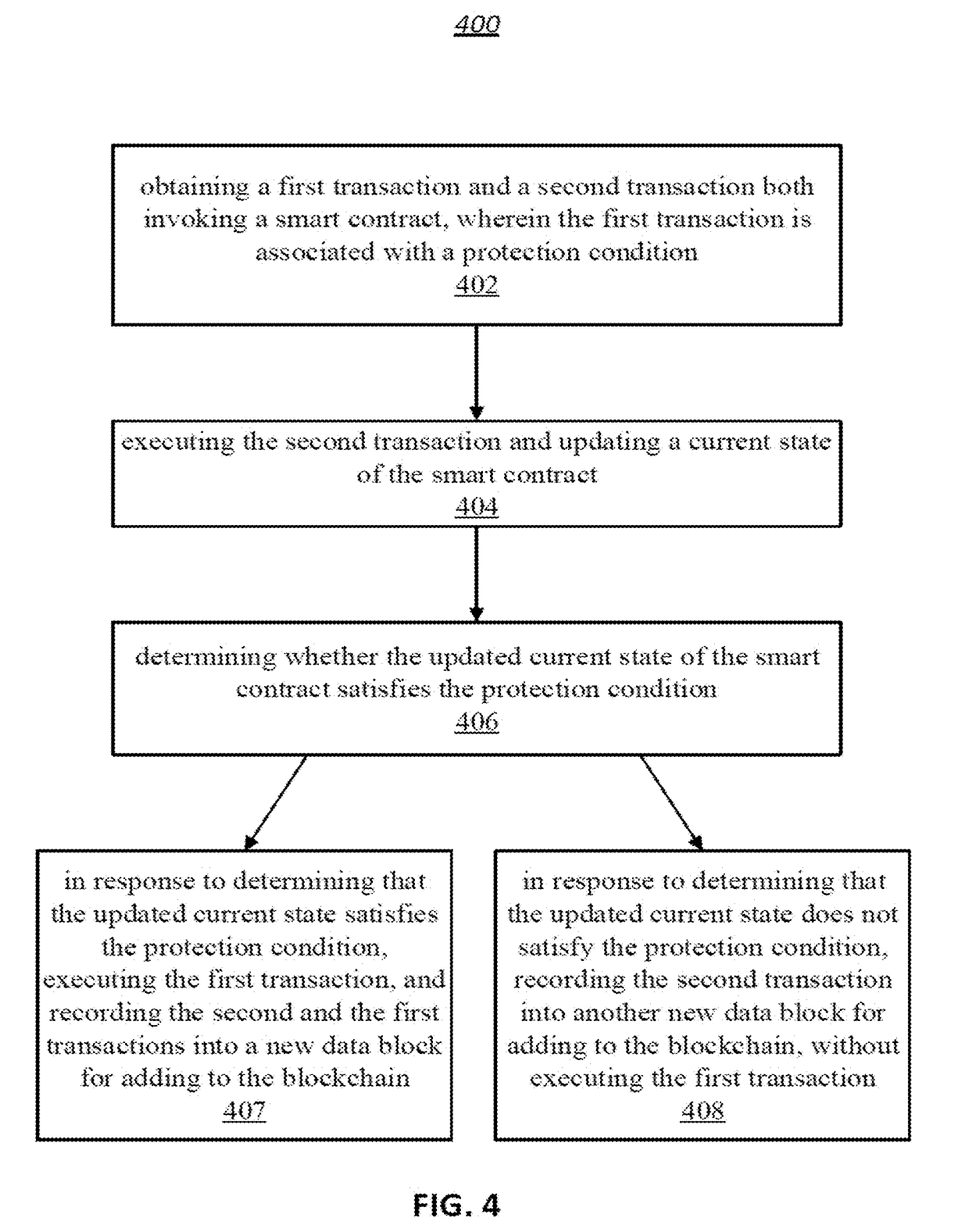
FIG. 4 illustrates a flowchart of an exemplary method for improving security of smart contract, in accordance with various embodiments.

FIG. 4 illustrates a flowchart of an exemplary method 400 for smart contract execution, in accordance with various embodiments. The method 400 may be implemented by a system including, for example, one or more components of the blockchain network 200 of FIG. 2A. The exemplary method 400 may be implemented by one or more of the nodes 202, the user computing device 240, and/or an Ethereum Virtual machine. The exemplary method 400 may be implemented by one or more components (e.g., processor, process and memory combination, one or more logic circuits, etc.) of the node 202. The method 400 may be implemented by multiple systems similar to the environment 200. The operations of the method 400 presented below are intended to be illustrative. Depending on the implementation, the exemplary method 400 may include additional, fewer, or alternative steps performed in various orders or in parallel.

Block 402 comprises: obtaining a first transaction (e.g., TxA) and a second transaction (e.g., TxB) both invoking a smart contract, wherein: the first transaction is associated with a protection condition. In some embodiments, executing the second transaction may change a current state of the smart contract (e.g., the price of the transactional item). In some embodiments, the protection condition is auto-generated based on the first transaction. In some embodiments, the protection condition is submitted by a computing device that submitted the first transaction. In some embodiments, there may or may not be an order of executing the first and the second transactions when they are received, for example, in the pool database. The second transaction may or may not have a protection condition.

In some embodiments, the current state comprises a current price of a transactional item of the smart contract; and the protection condition is associated with a price range (e.g., a preset price), an amount range, or a time range of the transactional item. For example, the first transaction is associated with a purchase order of the transactional item at the price range; and the second transaction is associated with a sales order of selling the transactional item.

In some embodiments, the blockchain nodes (e.g., node 202) are configured to periodically (e.g., every 10 minutes) collect unconfirmed transactions to store in a pool database; and obtaining the first transaction and the second transaction comprises obtaining the first transaction and the second transaction from the pool of unconfirmed transactions in the pool database. The node collecting and storing an unconfirmed transaction is not necessarily the node obtaining the unconfirmed transaction from the pool database. The pool of unconfirmed transactions has no order of execution, and after being obtained from the pool database and the following steps are performed, the order of execution can be determined.

In some embodiments, the blockchain nodes (e.g., node 202) each comprise a memory for storing a copy of the blockchain as a ledger; and to maintain the blockchain of data blocks, the blockchain nodes are configured to update the ledger when the new data block or the another new data block is added to the blockchain.

Block 404 comprises: executing the second transaction and updating a current state of the smart contract. The first and second transactions may be picked randomly for execution. This block captures a scenario that the second transaction is picked first.

Alternatively, in some embodiments, the first transaction may be executed before the second transaction, and the current state of the smart contract is updated.

Block 406 comprises: determining whether the updated current state of the smart contract satisfies the protection condition.

Block 407 comprises: in response to determining that the updated current state satisfies the protection condition, executing the first transaction, and recording the second and the first transactions into a new data block for adding to the blockchain.

Block 408 comprises: in response to determining that the updated current state does not satisfy the protection condition, recording the second transaction into another new data block for adding to the blockchain, without executing the first transaction. In some embodiments, block 408 further comprises: in response to determining that the updated current state does not satisfy the protection condition, returning an execution exception to a computing device that submitted the first transaction.

In some embodiments, the current state may be changed by any factor, not limited to a prior transaction (e.g., the second transaction). For example, a computer-implemented method for improving security of smart contract comprises: obtaining a first transaction invoking a smart contract, wherein the first transaction is associated with a protection condition; determining whether a current state of the smart contract satisfies the protection condition; in response to determining that the current state satisfies the protection condition, executing the first transaction, and recording the first transaction into a data block for adding to a blockchain; and in response to determining that the current state does not satisfy the protection condition, not executing the first transaction.

Figure 5:
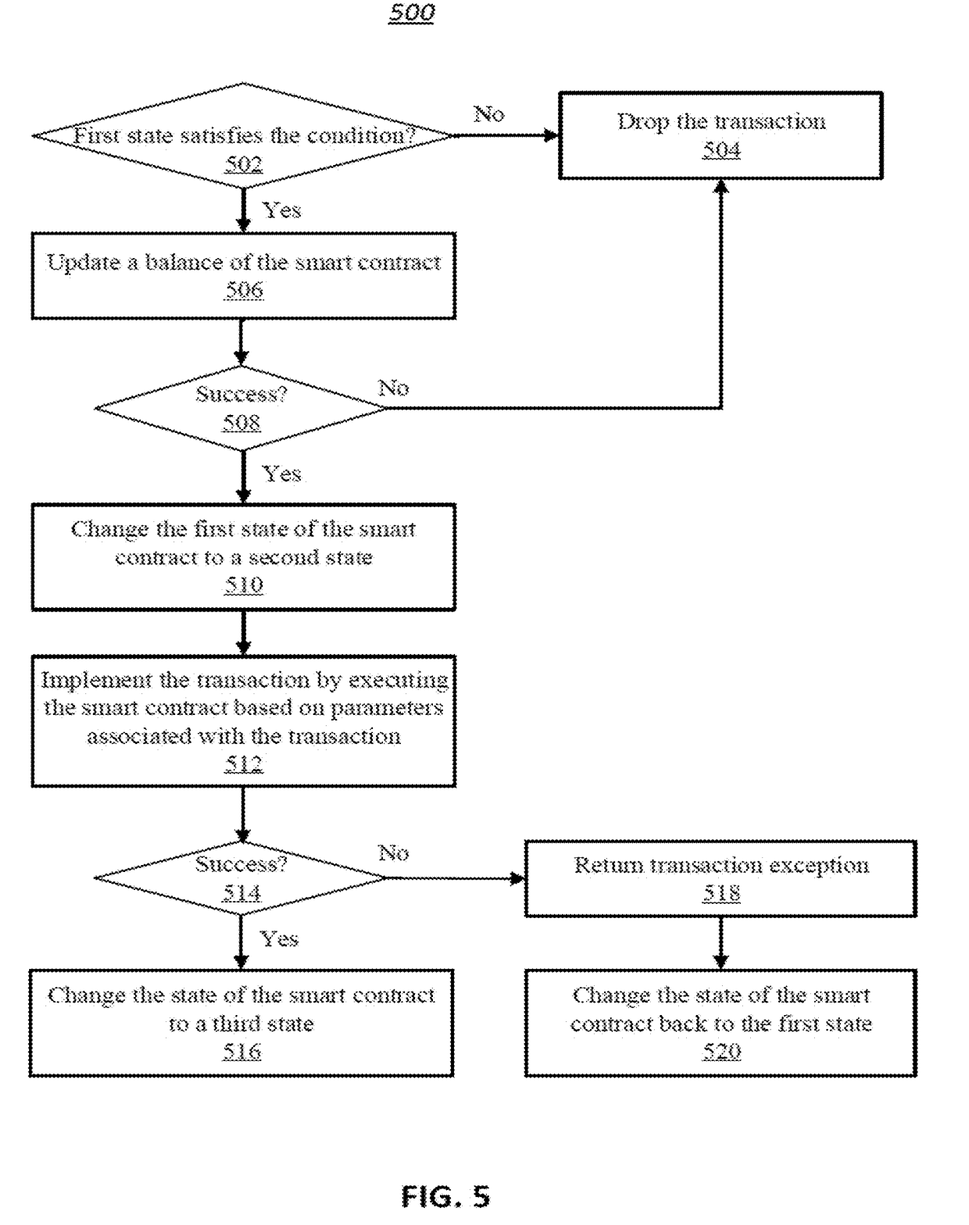
FIG. 5 illustrates a flowchart of an exemplary method for improving security of smart contract, in accordance with various embodiments.

FIG. 5 illustrates a flowchart of an exemplary method 500 for implementing transactions, in accordance with various embodiments. The method 500 may be implemented in various systems including, for example, the blockchain network 200 of FIG. 2A. The exemplary method 500 may be implemented by the node 202 and the user computing device 240. The method 500 may be implemented by multiple systems similar to the blockchain network 200. The operations of the method 500 can be an embodiment of the blocks 406 and 407 in FIG. 4. The operations of the method 500 presented below are intended to be illustrative. Depending on the implementation, the exemplary method 500 may include additional, fewer, or alternative steps performed in various orders or in parallel.

At block 502, it may be determined whether a current state (also referred to as first state) of a smart contract satisfies a condition of a transaction (e.g., the condition of the transaction received at block 402 in FIG. 4). The current state can be the "updated current state" in block 406 in FIG. 4. For example, the condition may be that the price of the goods is fixed at a value defined in the transaction. At block 504, if it is determined that the first state of the smart contract does not satisfy the condition of the transaction, the transaction may be dropped. For example, in the first state of the smart contract, if the price of the goods has been changed to a value different from the one defined in the transaction, the condition has not been met and the transaction may be dropped.

At block 506, if it is determined that the first state of the smart contract satisfies the condition of the transaction, a balance of the smart contract may be updated. At block 508, it may be determined whether the update of the balance of the smart contract has succeeded. If the update fails, the transaction may be dropped, as indicated at block 504. At block 510, if the update of the balance of the smart contract succeeds, the first state of the smart contract may be changed to a second state. At block 512, the transaction may be implemented by executing the smart contract based on parameters associated with the transaction. For example, the values of the parameters associated with the transaction may be passed to one or more processes of the smart contract, and the one or more processes may be executed.

At block 514, it is determined whether the execution of the smart contract has succeeded. At block 516, if it is determined that the execution of the smart contract has succeeded, the state of the smart contract may be changed to a third state. The transaction has been successfully implemented. At block 518, if the execution of the smart contract fails, an execution exception may be returned. At block 520, the state of the smart contract may be changed back to the first state. In some embodiments, block 407 in FIG. 4 may include the blocks 506-516 in FIG. 5.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques.

Figure 6:
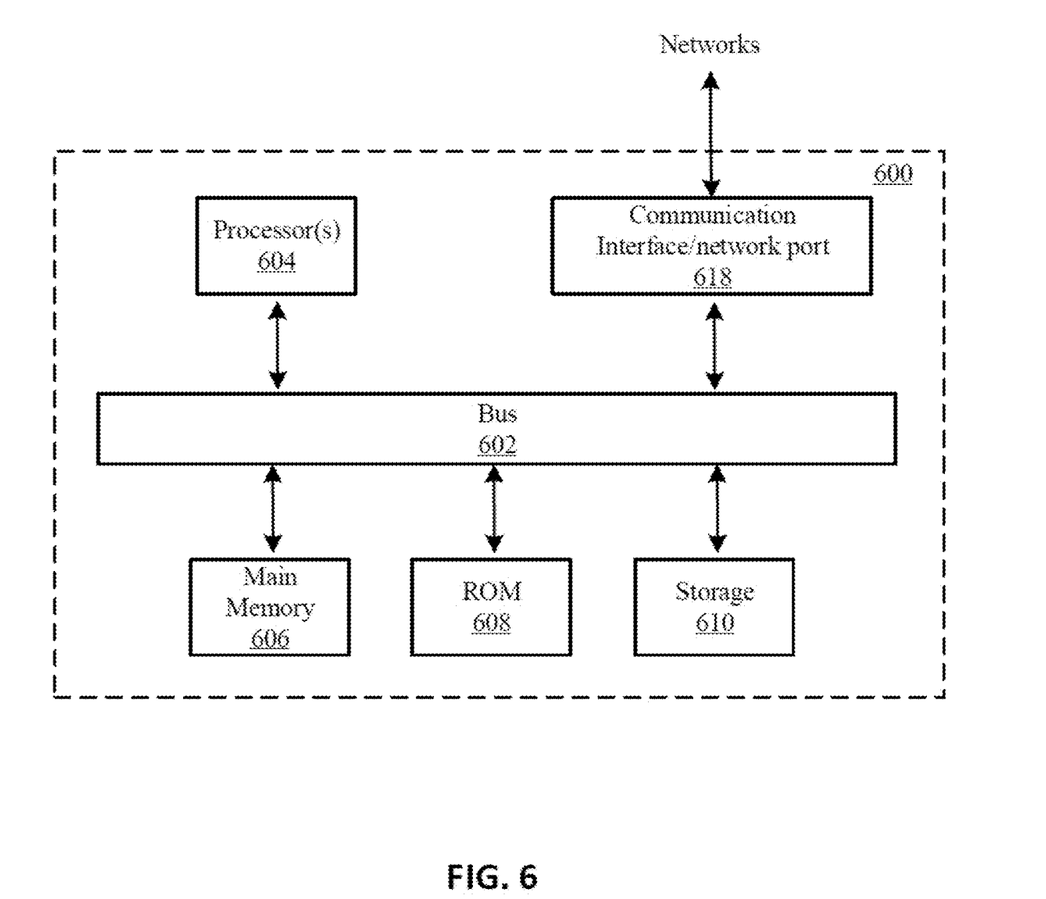
FIG. 6 illustrates a block diagram of an exemplary computer system in which any of the embodiments described herein may be implemented.

FIG. 6 is a block diagram that illustrates an exemplary computer system 600 in which any of the embodiments described herein may be implemented. The system 600 may correspond to the node 202 or the user computing device 240 described above with reference to FIG. 2A. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the operations, methods, and processes described herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The processor(s) 604 may correspond to the processor 204 described above, and the main memory 606, the ROM 608, and/or the storage device 610 may correspond to the memory 206 described above. The main memory 606, the ROM 608, and/or the storage 610 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 600 also includes a communication interface/network port 618 coupled to bus 602. Communication interface/network port 618 provides a two-way data communication coupling to one or more network links that are connected to one or more local networks. For example, communication interface/network port 618 may be an integrated services digital network (ISDN) card, cable modem, satellite modem, or a modem to provide a data communication connection to a corresponding type of telephone line. As another example, communication interface/network port 618 may be a local area network (LAN) card to provide a data communication connection to a compatible LAN (or WAN component to communicated with a WAN). Wireless links may also be implemented. In any such implementation, communication interface/network port 618 sends and receives electrical, electromagnetic or optical signals that carry digital data streams representing various types of information.

The computer system 600 can send messages and receive data, including program code, through the network(s), network link, and communication interface/network port 618. In the Internet example, a server might transmit a requested code for an application program through the Internet, the ISP, the local network, and the communication interface/network port 618. The received code may be executed by processor 604 as it is received, and/or stored in storage device 610, or other non-volatile storage for later execution.

Each of the schemes, mechanisms, solutions, processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry. In some embodiments, the processor(s) 604 may be implemented partially or entirely as the one or more logic circuits described above.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method, comprising:
   obtaining, by a blockchain node of a blockchain computer network, (1) a first transaction comprising an address of a smart contract in a blockchain on the blockchain computer network, one or more first parameters, and a first value and (2) a second transaction comprising the address of the smart contract in the blockchain, one or more second parameters, wherein a result of execution of the smart contract depends on, according to Transaction-Ordering Dependence (TOD), an order of execution of the first and second transactions;
   generating, by the blockchain node based on the first value, an execution condition of executing the smart contract based on the first transaction;
   selecting, by the blockchain node, the second transaction before selecting the first transaction;
   updating, by the blockchain node, a first world state of the blockchain to a first transitional state by updating the smart contract based on the second value;
   updating, by the blockchain node, the first transitional state to a second world state by calling executable code of the smart contract according to the address in the blockchain and the one or more second parameters;
   updating, by the blockchain node, the second world state to a second transitional state by updating the smart contract based on the first value;
   determining, by the blockchain node, whether the second transitional state of the blockchain satisfies the execution condition;
   determining, by the blockchain node, that the second transitional state does not satisfy the execution condition;
   reverting, by the blockchain node, the blockchain from the second transitional state to the second world state;
   recording, by the blockchain node, the execution of the second transaction corresponding to the second world state into a new data block without executing the first transaction; and
   discarding, by the blockchain node, the first transaction.

2. The method of claim 1, further comprising:
   returning, by the blockchain node, an execution exception to a computing device.

3. The method of claim 1, wherein:
   the execution condition is associated with a price range, an amount range, or a time range of an item.

4. The method of claim 3, wherein:
   the first transaction is associated with a purchase order of the item at the price range; and
   the second transaction is associated with a sales order of selling the item.

5. The method of claim 1, wherein: obtaining the first transaction and the second transaction comprises obtaining the first transaction and the second transaction from a pool database.

6. A system comprising one or more processors and one or more non-transitory computer-readable memories coupled to the one or more processors and storing instructions executable by the one or more processors, wherein execution of the instructions causes the one or more processors to perform operations comprising:
   obtaining (1) a first transaction comprising an address of a smart contract in a blockchain, one or more first parameters, and a first value and (2) a second transaction comprising the address of the smart contract in the blockchain, one or more second parameters, and a second value, wherein a result of execution of the smart contract depends on, according to Transaction-Ordering Dependence (TOD), an order of execution of the first and second transactions;
   generating, based on the first value, an execution condition of executing the smart contract based on the first transaction;
   selecting the second transaction before selecting the first transaction;
   updating a first world state of the blockchain to a first transitional state by updating the smart contract based on the second value;
   updating the first transitional state to a second world state by calling executable code of the smart contract according to the address in the blockchain and the one or more second parameters;
   updating the second world state to a second transitional state by updating the smart contract based on the first value;
   determining whether the second transitional state of the blockchain satisfies the execution condition;
   determining that the second transitional state does not satisfy the execution condition;
   reverting the blockchain from the second transitional state to the second world state;
   recording the execution of the second transaction corresponding to the second world state into a new data block without executing the first transaction; and
   discarding the first transaction.

7. The system of claim 6, wherein the is one or more processors are further caused to perform:
   returning an execution exception to a computing device.

8. The system of claim 6, wherein:
   the execution condition is associated with a price range, an amount range, or a time range of an item.

9. The system of claim 8, wherein:
   the first transaction is associated with a purchase order of the item at the price range; and
   the second transaction is associated with a sales order of selling the item.

10. The system of claim 6, wherein: obtaining the first transaction and the second transaction comprises obtaining the first transaction and the second transaction from a pool database.

11. A non-transitory computer-readable storage medium storing instructions executable by one or more processors, wherein execution of the instructions causes the one or more processors to perform operations comprising:
   obtaining (1) a first transaction comprising an address of a smart contract in a blockchain, one or more first parameters, and a first value and (2) a second transaction comprising the address of the smart contract in the blockchain, one or more second parameters, and a second value, wherein a result of execution of the smart contract depends on, according to Transaction-Ordering Dependence (TOD), an order of execution of the first and second transactions;

generating, based on the first value, an execution condition of executing the smart contract based on the first transaction;

selecting the second transaction before selecting the first transaction;

updating a first world state of the blockchain to a first transitional state by updating the smart contract based on the second value;

updating the first transitional state to a second world state by calling executable code of the smart contract according to the address in the blockchain and the one or more second parameters;

updating the second world state to a second transitional state by updating the smart contract based on the first value;

determining whether the second transitional state of the blockchain satisfies the execution condition;

determining that the second transitional state does not satisfy the execution condition;

reverting the blockchain from the second transitional state to the second world state;

recording the execution of the second transaction corresponding to the second world state into a new data block without executing the first transaction; and discarding the first transaction.

12. The storage medium of claim 11, the processor is caused to further perform:

returning an execution exception to a computing device.

13. The storage medium of claim 11, wherein:

the execution condition is associated with a price range, an amount range, or a time range of an item.

14. The storage medium of claim 13, wherein:

the first transaction is associated with a purchase order of the item at the price range; and the second transaction is associated with a sales order of selling the item.

15. The storage medium of claim 11, wherein: obtaining the first transaction and the second transaction comprises obtaining the first transaction and the second transaction from a pool database.

* * * * *

UNITED STATES PATENT AND TRADEMARK OFFICE
CERTIFICATE OF CORRECTION

PATENT NO.           : 11,138,597 B2
APPLICATION NO.      : 16/709817
DATED                : October 5, 2021
INVENTOR(S)          : Zhongxiao Yao It is certified that error appears in the above-identified patent and that said Letters Patent is hereby corrected as shown below:

In the Claims

In Claim 7, Column 18, Lines 45-46, "wherein the is one or more" should read -- wherein the one or more --.

Signed and Sealed this
Thirtieth Day of August, 2022

Katherine Kelly Vidal
*Director of the United States Patent and Trademark Office*